(No Model.) 2 Sheets—Sheet 1.

E. BURSTOW.
VELOCIPEDE.

No. 248,998. Patented Nov. 1, 1881.

Witnesses
Jas. E. Hutchinson
J. A. Rutherford

Inventor
Edward Burstow,
by James L. Norris
Atty.

(No Model.) 2 Sheets—Sheet 2.

E. BURSTOW.
VELOCIPEDE.

No. 248,998. Patented Nov. 1, 1881.

Witnesses.
Jas. E. Hutchinson.
J. A. Rutherford

Inventor.
Edward Burstow,
by James L. Norris,
Atty.

N. PETERS, Photo-Lithographer, Washington, D. C.

UNITED STATES PATENT OFFICE.

EDWARD BURSTOW, OF HORSHAM, COUNTY OF SUSSEX, ENGLAND.

VELOCIPEDE.

SPECIFICATION forming part of Letters Patent No. 248,998, dated November 1, 1881.

Application filed September 27, 1881. (No model.) Patented in England December 16, 1880.

*To all whom it may concern:*

Be it known that I, EDWARD BURSTOW, a subject of the Queen of Great Britain, residing at Horsham, in the county of Sussex, England, and doing business at 91 Queen Street, Cheapside, in the city of London, both in the Kingdom of Great Britain, have invented certain new and useful Improvements in Velocipedes, (for which I have obtained a patent in Great Britain, No. 4,707, bearing date December 16, 1880,) of which the following is a specification.

The object of my invention is to produce a velocipede which shall combine most of the advantages of a bicycle with some of those possessed by machines with a greater number of wheels.

I construct the velocipede, according to my invention, as shown in the accompanying sheet of drawings, forming part of this specification, in which—

Figure 1:
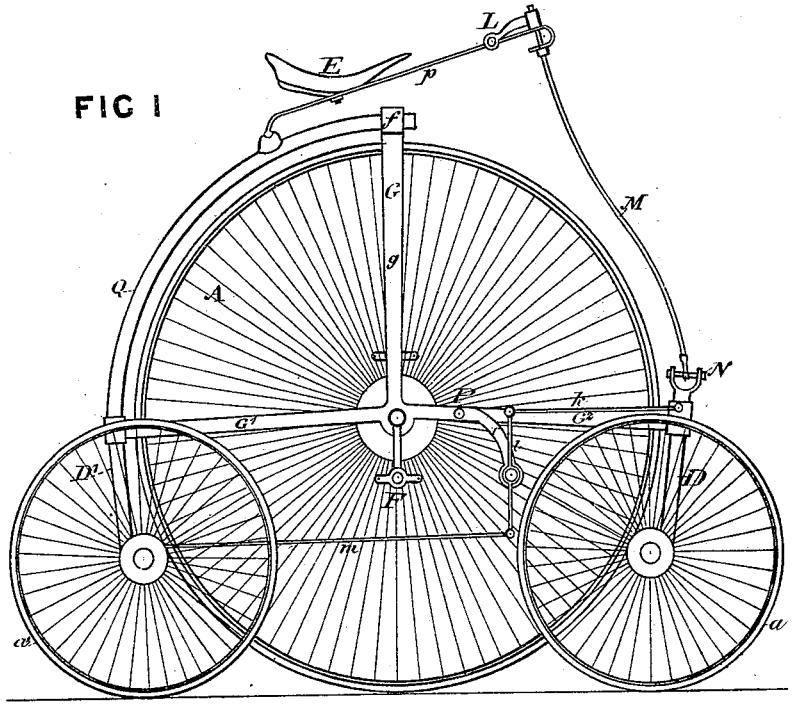
Figure 2:
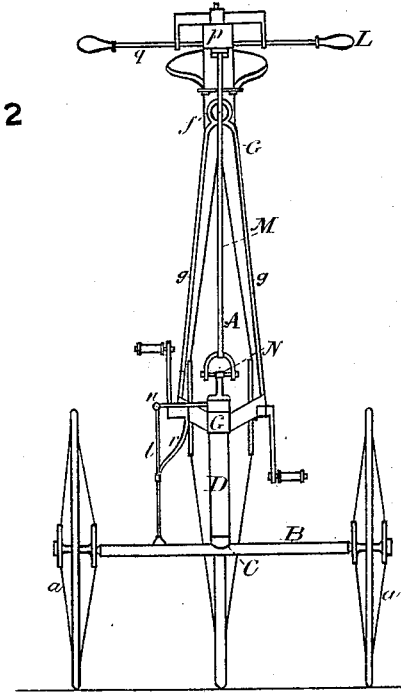
Figure 3:
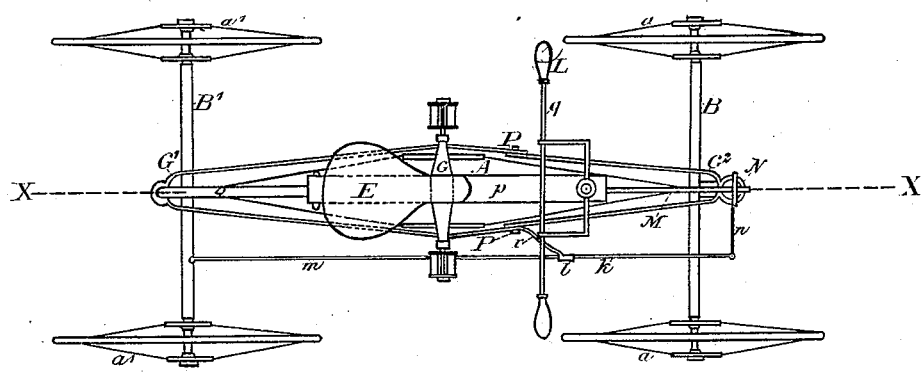
Figure 4:
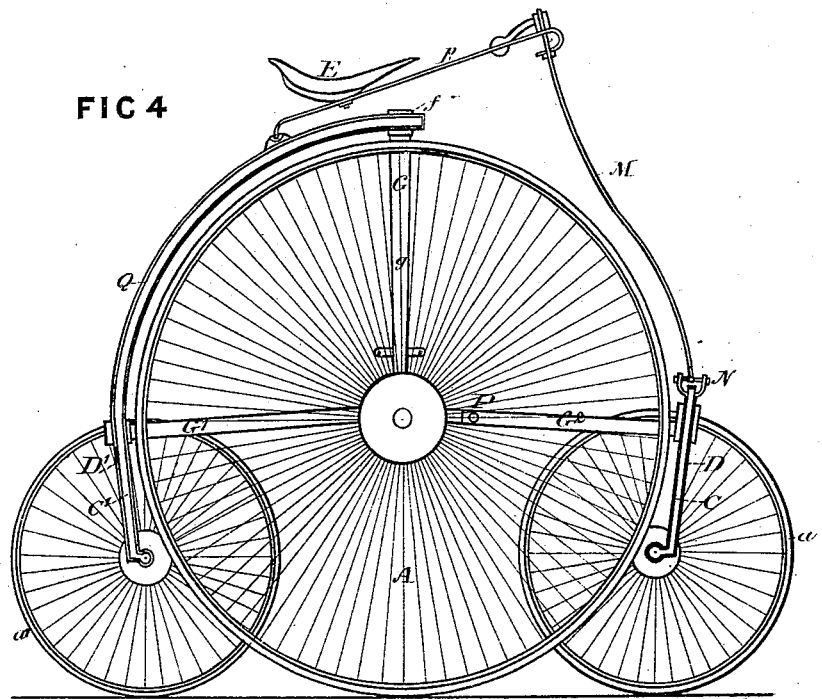

Figure 1 represents a side elevation of the velocipede; Fig. 2, a front elevation. Fig. 3 is a plan, and Fig. 4 a vertical section taken on the line X X.

Similar letters refer to similar parts throughout the several views.

A indicates a large central wheel, and $a\ a\ a'\ a'$ four smaller wheels. The rider sits on a saddle, E, over the large wheel, and the treadles F F are fitted to the axle of the large wheel, and are worked in the same way as those of an ordinary bicycle. The four small wheels $a\ a\ a'\ a'$ are arranged in pairs, two behind and two before, the axles B B' of each pair of wheels being connected with the spindles C C', which work in tubular bearings D and D', forming parts of the frame.

The tubular bearings may be vertical; but I prefer to incline them slightly outward, as shown in the drawings—that is, the front one, D, inclining forward, and the back one, D', inclining backward—in order to give the various wheels the proper relative motion in running round curves, as hereinafter explained.

I construct the frame with a tubular backbone, Q, which is curved to follow the shape of the wheel for rather more than a quarter of a circle, and beyond this, toward the lower end, is straight and forms the tubular bearing D' for the reception of the spindle C'.

The part marked G represents a piece which in a bicycle would be called the "fork," and which consists of an eye, $f$, into which the backbone Q is secured, and two flattened bars, $g\ g$, extending one down each side of the wheel to the axle-boxes, on which they rest and to which they are secured. G' is a nearly similar fork, placed nearly horizontally, holding the backbone Q in its eye, and welded or otherwise rigidly fixed to the fork G immediately over each of the axle-boxes, beyond which it extends to the joints P P, and thence on one side only in the form of an arm, $r$, to support the joint at the center of the lever $l$. Another fork, $G^2$, is attached to G' by joints P P on each side of the large wheel, and carries the tubular bearing D of the spindle C.

The axles B B', carrying the pairs of small wheels $a\ a$ and $a'\ a'$, are coupled together by the bars and levers $k$, $l$, $m$, and $n$, of which $n$ is a short bar fixed to the spindle C, and which transmits the motion of the said spindle to the bar $k$, by which it is transmitted to the lever $l$, which, turning on the fulcrum-pin at its center, transmits the motion from its lower end, but in the reverse direction to the bar $m$, by which it is communicated to the horizontal axle B', so that when the spindle C, to which is fixed the horizontal axle B, is turned on its nearly vertical axis so as to lock or turn the front pair of small wheels the back pair follows, but in the opposite direction, so as to cause the machine to run in a curve. This locking or turning motion of the small wheels is controlled by the cross-handle L in front of the rider, which is connected with the upper end of the spindle C by the connecting-rod M and the universal joint N. The obliquity of the spindles C C' causes the locking or turning of the small wheels to cause the large one A to be slightly canted over on one side, so that on passing along a curve it inclines toward the center of the curve, by which it is caused to take naturally the same direction on the ground as the small wheels, and the whole of them are thus made to act harmoniously.

I find that it answers well in practice to fix the spindles C C' to the bars B B', so that the center of each spindle may be about an inch and a half from each right line connecting the centers of each said pair of wheels, as shown in the drawings, where the scale is one inch to a foot, and the degree to which the spindles C C' may with advantage be inclined is such that the lines of their direction, when produced downward, shall meet the ground vertically under the axes of each said pair of wheels. In other words, the line of direction of each spindle C C' is thrown a little on one side of each corresponding axis of the pair of wheels and meets the ground in the line joining the points where the said wheels are in contact with the ground.

The saddle E, I fix on a spring, $p$, the back end of which is attached to the backbone Q, and the other end of which is bent over, as shown on the drawings, to receive and support the connecting-rod M and the steering-handle L. The rod M passes through two holes in the spring $p$, which spring passes through a long slot in the bar $q$ of the handle L, so that by slightly turning the handle and bar on their own axis the spring $p$ is nipped and the handle retained firmly in its position.

It will be observed that the joints P P enable either of the pairs of wheels or the central wheel to rise or fall with the irregularities of the ground independently of the others, and the proportion of the load to be borne by the central and by the other wheels may be regulated by varying the position of the saddle and its attachments.

What I claim as my invention, and desire to secure by Letters Patent, is—

1. The construction and arrangement, as herein described, of velocipedes having a fifth or central wheel for driving, with a frame constructed and acting substantially in the manner set forth.

2. The inclined pivots or spindles C C', for causing the central wheel to cant over to one side when the velocipede is running round a curve, substantially as and for the purpose described.

3. The combination and arrangement of the steering-gear L M N and $k$ $l$ $m$ $n$ and the spring $p$ and saddle E.

4. The frame composed of the parts G G' $G^2$ Q, jointed at P P, so as to allow either pair of wheels or the central wheel to rise or fall independently of the others.

5. The combination and arrangement, in velocipedes having a fifth or central wheel, of a frame jointed as at P P, the inclined pivots or spindles C C', and the steering-gear.

London, 1st September, 1881.

EDWARD BURSTOW.

Witnesses:
NEWNHAM BROWNE,
*Patent Agent, 91 Queen Street, London, E. C.*
JNO. DEAN,
*Clerk to Messrs. Scorer & Harris, Notaries, 17 Gracechurch Street, London.*